United States Patent [19]

Bergman et al.

[11] Patent Number: 4,855,861
[45] Date of Patent: Aug. 8, 1989

[54] LONGITUDINAL DIFFERENTIAL PROTECTION

[75] Inventors: Sten Bergman; Stefan Ljung, both of Västerås, Sweden

[73] Assignee: Asea Brown Boveri AB, Västerås, Sweden

[21] Appl. No.: 262,742

[22] Filed: Oct. 26, 1988

[30] Foreign Application Priority Data

Nov. 12, 1987 [SE] Sweden ............................. 8704424

[51] Int. Cl.$^4$ .............................................. H02H 7/26
[52] U.S. Cl. ........................................ 361/65; 361/79;
361/81; 324/512; 324/522; 364/483
[58] Field of Search ..................... 361/65, 79, 85–87,
361/80, 81, 76; 324/509, 512, 521, 522, 525;
364/481–484

[56] References Cited

U.S. PATENT DOCUMENTS

| | | | |
|---|---|---|---|
| 4,148,087 | 4/1979 | Phadke | 361/80 |
| 4,261,038 | 4/1981 | Johns et al. | 324/524 X |
| 4,719,580 | 1/1988 | Nimmersjö | 324/512 X |
| 4,731,689 | 3/1988 | Nimmersjö | 361/81 X |

OTHER PUBLICATIONS

J. Esztergalyos, D. C. Erickson and J. N. Andres, Proceedings of the American Power Conference; Apr. 24–26, 1984; Chicago; the Application of Synchronous Clocks for Power System Fault Location, Control and Protection; pp. 437–447.

W. S. Kwong et al., IEE Power System Protection Conference; Apr. 1985; London; A Microprocessor-Based Current Differential Relay for Use with Digital Communication Systems; pp. 65–69.

Yamaura et al., IEE Power System Protection Conference, Mar. 1980; London; FM Current-Differential Carrier Relaying; pp. 156–160.

Aggarwal et al., IEE Power Protection Meeting; Apr. 1985; London; High Speed Differential Protection of Teed Circuits using Wideband Communication Techniques; pp. 60–64.

*Primary Examiner*—Todd E. Deboer
*Attorney, Agent, or Firm*—Watson, Cole, Grindle & Watson

[57] ABSTRACT

The present invention comprises a longitudinal differential protective relay for protection and supervision of power line zones in a distribution system. The protective relays are located at each end of the zones that are desired to be monitored. One of the protective relays operates as a master for the other slave protective relays. A TRIP function indicating a line fault in any protected zone is performed by transmitting locally processed measured signals to the central protective relay which determines if and when any measure is to be taken. Each local protective relay comprises a measuring device, a filter and an A/D converter for phase currents and voltages. The digital signals are used to generate a truncated Fourier model of the measured signals in a parameter estimator which cooperates with a frequency estimator and a sampling regulator which, via a synchronization unit, ensures that sampling is performed simultaneously in all protective relays included in the protective system. In the parameter estimator the residuals of the phase quantities are also generated. Fourier components and residuals are supplied to a logic unit where local loss functions, based on the residuals, are compared with set threshold values for evaluation of whether an abrupt event in the network has occurred.

3 Claims, 1 Drawing Sheet

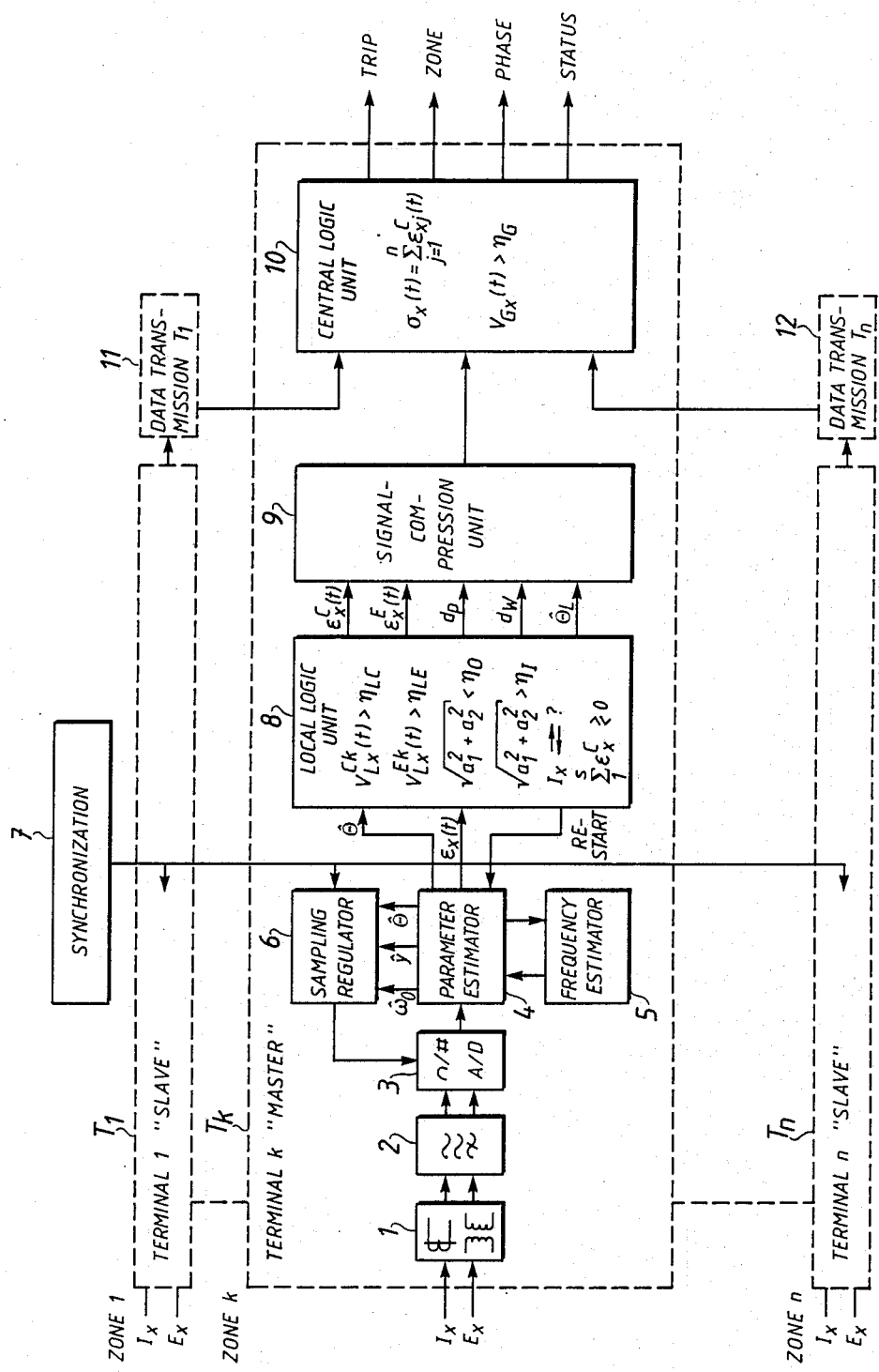

LONGITUDINAL DIFFERENTIAL PROTECTION

TECHNICAL FIELD

The present invention relates to a longitudinal differential protective relay. Such protective relays are used for monitoring and protection of transmission lines in power distribution systems.

Because of the great demand for electric power, the supply of such power has become characterized by remotely located power stations and long transmission lines with great capacity. For distribution of the electric power, a number of switching and measuring stations often also exist. A transmission network can be supplied and connected in a plurality of different ways. By locating protective devices of different kinds in the stations, parts or zones of a lengthy transmission line, and also or more complicated networks, can be protected. From the points of view of measurement and protection, these types of stations will be commonly designated "terminals" in this description.

BACKGROUND ART

The primary task of a longitudinal differential protective relay comprises providing
  a clear and rapid discrimination between faulty and faultless conditions
  a clear discrimination of fault zones of a transmission line
  a clear discrimination of a faulty phase.

The classical and predominant technique for imparting these properties to a longitudinal differential protective relay is based on the fact that the vector sum of corresponding terminal currents at the two ends of a protected line zone is to be zero when the line is in a faultless condition and that a possible vector sum is equivalent to the fault current when a fault has occurred on the line.

To be able to carry out the vectorial summation between currents at different terminals belonging to the protective system of a power transmission line, some form of communication facility between the terminals is required. The present technique for communication comprises the use of so-called metallic pilot wires, largely disposed parallel to the transmission line to be protected. Unfortunately, this technique often limits the use of current comparison protective devices to relatively short transmission lines. According to Kirchhoff's laws, the general rule applies that the amount of supplied current is equal to the amount of discharged current. For transmission lines, this is quite correct for shorter line distances. On longer lines, however, capacitive charging currents occur which may have an influence on the measurement result. To limit the effect of these, according to the prior art the line distances for a protective zone are maximized, for example so that the charging current shall be less than a certain value of the primary current of the measuring current transformers. With the present technique, this requirement entails that a protective zone seldom exceeds 20 km.

In addition to the above-mentioned primary requirements on a longitudinal differential protective relay, they should also be stable, i.e. they shall not indicate a fault in the case of large surge currents passing through the line, in the case of power swings, and in the case of extreme load conditions.

As will have been clear from the above, there are a number of technical problems to be solved in connection with the embodiment of a longitudinal differential protective relay. Therefore, it is also desirable and necessary to obtain such protective relays with performance and properties superior to those offered by the classical analog technique.

In the field of protective relays, numerical technique with computer controlled systems have come into use in recent years. This is also true of the field of longitudinal differential protective relays. A new technique has also been applied for the necessary communication between the terminals, for example in the form of communication concepts operating over telephone frquency or wide-band communication links, optical conductors, etc.

A longitudinal differential protective relay according to the invention is based on the achievements made through the use of numerical technique and computer controlled systems. Based on these techniques a large number of concepts are available for solving the specific problems which are associated with longitudinal differential protective relays.

The general base for these computer controlled and numerically working protective relays comprises using measured values of the quantities in question, as a rule phase currents and phase voltages, for obtaining unknown system parameters of mathematical models of the measured signals. By regarding the measured signals as stochastic variables, theories from signal processing and statistics can be applied for estimating the unknown system parameters in the signal models. The parameters may be Fourier coefficients, mean values or line parameters. A parameter estimating protective relay offers new possibilities of realizing known protective relay principles, which means that they permit a general solution of the measurement function for protective relays.

The advantage of a parameter estimating protective relay is chiefly that the protective relay becomes an adaptive filter, in which the accuracy of the estimated parameters can be controlled to the desired level. In the case of transients, information about model faults as well as parameters can be utilized, which leads to both transient-measuring and steady-state measuring functions.

There are many ways of realizing parameter estimators and longitudinal differential protective relays based on this technique. A number of reports describing the prior art will be described in the following.

W. S. Kwong et al, at the IEE Power System Protection Conference, April 1985, London, presented a microcomputer-based current differential protective relay for transmission lines having two or more end points. This protective relay is characterized by a function image of about 30 ms, has separate comparison of phase and amplitude for the currents, has continuous supervision and measurement of the time delay of the communication channel as well as compensation for variable delay time on the channel.

Yamaura et al, at the IEE Power System Protection Conference, March 1980, London, presented a publication entitled "FM Current-Differential Carrier Relaying". According to the model described, the instantaneous currents at each terminal are modulated to frequency signals within the frequency band for voice-frequency signals, i.e. 300–3400 Hz. These signals are transmitted to other terminals via communication links such as microwaves and optical fibres. Otherwise, this protective relay is characterized in that it is bassed on semiconductors, has separate detection of phases for both phase-to-phase faults and phase-to-ground faults, has an operating time related to 60 Hz of 12-16 ms and in that the phase comparative system is dependent on suitable communication links to transmit the frequency-modulated carrier wave.

Aggarwal et al, at the IEE Power Protection Meeting, April 1985, London, presented a publication entitled "High Speed Differential Protection of Teed Circuits Using Wideband Communication Techniques". This describes the bases of a fast, differential current-based concept for T-shaped supply lines based on the master/slave technique and using a fibre-optic link as means of communication. The fundamental mode of operation is based on deriving a differential quantity and a bias quantity by using the instantaneous values of modally converted currents at the three ends of the T-shaped circuit. The use of modally transformed currents instead of phase currents increases the stability of the relays in faultless circuits when being applied to double lines. This relay design has arisen from a series of CAD studies.

In summary, it can thus be said that the principle of relays with differential currents is well-known and simple. Kirchhoff's fist law is used for a transmission circuit and the sum of the terminal currents has to be equal to the charging current in the circuit. A simple vector summation of the terminal currents, however, is not sufficient for a protective relay, since a minor fault when estimating the terminal currents when there is a heavy load could result in the determination of an internal fault.

In addition to the general description made above regarding the principles of computer-based protective relays and protective relays based on mathematical models as well as the description of a number of published concepts, a short reference will also be made of the methods for estimation of the parameters which are used in a longitudinal differential protective relay according to the invention. These methods are described in detail in U.S. application Ser. No. 212,225, filed June 27, 1988 ("Frequency relay") and comprises transforming a measured signal obtained from the network, after filtering and digitization, into an analytical model in the form of a truncated Fourier series expansion. The Fourier coefficients are determined in a parameter estimator operating with an estimation method in accordance with the least squares method. Starting from model values, according to this concept a computation of the frequency can be performed in a frequency estimator, the output signal of which is partly returned as the actual frequency value to the parameter estimator and partly constitutes a measure of the actual frequency. This part of the frequency relay according to U.S. application Ser. No. 212,225 is incorporated in the longitudinal differential protective relay according to the present invention. The parameter estimation in question is clear from the following. The measured signals in question can be modelled as follows:

$$y(t) = a_0 \exp(-b_0 t) + \sum_{1}^{N} c_j \sin(\omega_j t + d_j) \quad (1)$$

which can be transformed to $$y(t) = \theta^T \phi(t) \quad (2)$$

where $$\theta^T = (a_0, -a_0 b_0, c_1 \cos d_1, c_1 \sin d_1, \ldots c_N \cos d_N, c_N \sin d_N) \quad (3)$$

is a parameter estimation vector and $$\phi(t) = (1, t, \sin \omega_0 t, \cos \omega_0 t, \ldots \sin N\omega_0 t, \cos N\omega_0 t) \quad (4)$$

is a regression vector.

Estimation of the parameters according to the least squares method entails minimizing the value of a "loss function" $V_N$. $V_N$ can be written as $$V_N(\lambda, t) = \sum_{j=1}^{t} \lambda^{t-j} \epsilon^2(j) = \lambda \cdot V_N(\lambda, t-1) + \epsilon^2(t) \quad (5)$$

where $\lambda$ is a forgetting factor and where $\epsilon(t)$ is an estimation error function.

The minimization gives the following equation for $\theta(t)$ $$\theta(t) = \left[ \lambda^t P^{-1}(0) + \sum_{j=1}^{t} \lambda^{t-j} \phi(j) \phi^T(j) \right]^{-1} \left[ \sum_{j=1}^{t} \lambda^{t-j} \phi(j) y(j) \right] \quad (6)$$

The actual estimation is performed recursively with the aid of the following algorithm $$R(t) = \lambda \cdot R(t-1) + \phi(t) \phi^T(t) \quad (7)$$

$$R(0) = \delta \cdot I \quad (8)$$

$$R(t) L(t) = \phi(t) \quad (9)$$

$$\hat{y}(t) = \hat{\theta}^T(t-1) \phi(t) \quad (10)$$

$$\epsilon(t) = y(t) - \hat{y}(t) \quad (11)$$

$$\hat{\theta}(t) = \hat{\theta}(t-1) + L(t) \epsilon(t) \quad (12)$$

Here, R(t) is the covariance matrix of the regression vector and P(t) according to the below constitutes the inverse thereof. Otherwise, the following recurrence formulae are used $$r(t) = P(t-1) \phi(t) \quad (13)$$

$$d(t) = \lambda + \phi^T(t) r(t) \quad (14)$$

$$L(t) = r(t)/d(t) \quad (15)$$

$$P(t) = (P(t-1) - r(t) L^T(t))/\lambda \quad (16)$$

$$P(0) = (1/\delta) \cdot I \quad (17)$$

$$\theta(0) = \theta_0 \quad (18)$$

One problem in connection with longitudinal differential protective relays using several terminals is to relate the measured signals, in a distributed area of protection, to the same points in time. One method that has been used comprises detecting the zero crossings of the measurement signals, but for multi-terminal networks this is not a particularly reliable method for different reasons. In these situations, instead, a different method is used which is based on optical communication and transmission of special synchronizing impulses.

In an article published at the Proceedings of the American Power Conference, Chicago, Apr. 24–26, 1984, entitled "The application of synchronous clocks for power system fault location, control and protection, pp. 437–447, by J. Esztergalyos, D. C. Erickson and J. N. Andres, a method of synchronizing measurement at several locations with the aid of synchronizing impulses from satellite clocks is described. This technique is applied for synchronized measurement/sampling in longitudinal differential protective system according to the invention. The method will be described in more detail with reference to the further description of the invention.

As will be clear from above, in connection with longitudinal differential protection it is very important to have access to a good communication channel between the terminals included in the protective system. When a protective system is based on computer and numerical technique, it is self-evident that also the communication is carried out with the same technique. The development within the fibre optics and also conventional carrier wave systems nowadays permit high-quality communication and the possibility of a relatively high information flow. However, a limiting factor for the amount of information is the band width of the communication channel. Using today's technique this means that the signal transmission capacity is limited to 64 kbit/s.

When transmitting three-phase current residuals, it can be shown that a smallest speed of communication of 36 kbit/s is required. In addition to these measured values, transmission requirements for check bits, possible absolute value information, protocols, and the like, are to be added. By using some code compression technique, noise and large signal values can be reduced. Taken together, however, the necessary amount of information comprises a transmission requirement which lies within the scope of the available, i.e. 64 kbit/s.

The basis of the fault location, both as regards line zone and phase, is described in U.S. application Ser. No. 241,370, filed Sept. 7, 1988 ("High resistance ground fault protection"). Knowledge of the direction to a fault can be obtained by studying the polarity of the current residuals after the occurrence of a fault. The condition for this is that there are terminals on both sides of the line zones in question and that there are communication facilities between the stations. The general rule is then that if the currents at both measuring points are directed away from the protected zone, the signs of the instantaneous residuals in the faulted phases at the respective measuring points are to be the same if the fault has occurred within the zone. The same criterion of the sign also applies if both currents are directed towards the interior of the protected zone. The fault is also present within the protected zone when the signs are different and when the current at one measuring point is directed towards the interior of the protected zone and the current at the other measuring point is directed away from the measuring point. The sign is determined by integrating the residuals during a certain time from the instant of the fault.

By studying the loss function or the amplitude of the harmonics, information can be obtained as to which of the phase or phases has or have faulted.

DISCLOSURE OF THE INVENTION

To protect line zones in a power transmission system which can be supplied from several different power stations and which may be connected together in different ways, it is assumed that terminals are provided at all the ends of each protected line zone. Longitudinal differential protective relays according to the invention must be provided at the terminals. These protective relays shall comprise a plurality of functions which together offer a possibility of determining whether a fault has occurred, at the same time indicating which line zone has faulted. The protective relay shall comprise the possibility of measuring phase current and phase voltage at each terminal making a Fourier series expansion of measured phase quantities with the aid of a parameter estimator and a frequency estimator, corresponding to the technique described, inter alia, in U.S. application Ser. No. 241,370 ("Frequency relay")

producing the residuals of the phase currents and phase voltages with signs (according to equation (11))

producing the value of corresponding loss functions (according to equation (5)), and adapting the time between the samplings so that the number of sampling points is constant, independently of any frequency variations.

The longitudinal differential protective relay according to the invention is based on transmitting the residuals of the phase currents and phase voltages from all the terminals to a central unit. The concept according to the invention imposes no restriction on the number of terminals. For synchronized sampling of the measured signals at the different terminal points, it is assumed that local clocks are available at the terminals which can be calibrated via satellite pulses. This synchronization is necessary, inter alia, to be able to determine the phase difference between the signals at the different terminal points.

As will be clear from the above description of the prior art, relatively simple means exist of determining the presence of a fault when a single line with terminals is provided at both ends of the line zone. However, in the case of a large power network with an unlimited number of line zones, optionally connected to each other, the invention offers the possibility of determining whether a fault has occurred on a line zone. To be able to determine whether a fault exists within any of the line zones, it is sufficient to study two situations, namely, that all the currents are directed away from the zone in question or towards the interior of the zone in question. In both these cases, a fault exists within the zone in question if the signs of the residuals are the same.

The theoretical basis for determining a fault in a general power transmission network will be clear from the following description. The terminals in the network to be protected are numbered from 1 to n, i.e. 1, 2, ..., k, ..., n. The residuals from the estimation of the current in the R-phase at terminal k are designated $\epsilon_{Rk}^C$ and the corresponding residual for the voltage is $\epsilon_{Rk}^E$. In a longitudinal differential protective system according to the invention, it is presupposed that all the residuals from all the terminals are collected in one unit, which in the following description will be called the central logic unit. In this unit, the residuals for the currents from all the terminals in the different phases are summed up as follows:

$$\sigma_x(t) = \sum_{j=1}^{n} \epsilon_{(xj)}^{C}(t) \tag{19}$$

where C indicates that the summation relates to the current residuals and that $x\epsilon(R, S, T)$.

For a symmetrical faultless three-phase system, $\sigma_x$ is then to be small in magnitude. A condition for this, however, is that the number of Fourier coefficients for the signal models are the same for the different phases. It can therefore be suitable and also sufficient to allow the estimation to comprise only the fundamental frequency, i.e. the model of the current and voltage signals, $\hat{M}$, is estimated as $$\hat{M} = a_1 \sin \omega_0 t + a_2 \cos \omega_0 t \tag{20}$$

The three $\sigma$-quantities according to (19) can now be used to determine if a fault has occurred in the network. For this purpose it is suitable to generate the following loss functions $$V_{Gx}(t) = \sum_{j=1}^{t} \lambda^{t-j} \sigma_x^2(j) = \lambda V_{Gx}(t-1) + \sigma_x^2(t) \tag{21}$$

The subindex G is here intended to show that $V_{Gx}$ is a variable used to make decisions about the entitre network system and not only about the state of a single parameter estimator. As usual, $\lambda$ is a forgetting factor (see equations (5), (6) and (7)) which is chosen in the interval 0.5–1.0. It is also suitable to determine a threshold value for testing the $V_{Gx}$-functions whether a fault has occurred in the network. For $x\epsilon(R, S, T)$ the following is set $$V_{Gx}(t) > \eta_G \tag{22}$$

$\eta_G$ being equal to a setting parameter which depends on the network that is to be protected, the used signal model, and the hardware structure. The central logic unit which receives all the signals and processes them according to the above, is suitably located at one of the terminals. From there a TRIP signal is then delivered, information about the faulty zone and phase as output data if a fault has occurred, as well as the current fault conditions.

As will be clear from the above, each terminal is to have a local version of the longitudinal differential protective relay, the logic of which is based on the local residuals and which, in addition, is provided with a possibility of obtaining the value of the following loss functions, here exemplified for terminal No. k, $$V_{Lx}^{Ck}(t) = \sum_{j=1}^{t} \lambda^{t-j} (\epsilon_{xk}^{C}(j))^2 = \lambda V_{Lx}^{Ck}(t-1) + (\epsilon_{xk}^{C}(t))^2 \tag{23a}$$

$$V_{Lx}^{Ek} = \sum_{j=1}^{t} \lambda^{t-j} (\epsilon_{xk}^{E}(j))^2 = \lambda V_{Lx}^{Ek}(t-1) + (\epsilon_{xk}^{E}(t))^2 \tag{23b}$$

Index E indicates that the functions are based on voltage values and that subindex L stands for local variables. By testing these functions locally against set values, it is determined whether any abrupt event has occurred. At each indication of an abrupt change in the system, the parameter estimator is to be restarted to enable it to adjust itself more rapidly to the new dynamics. Whether an established, abrupt event is to result in a TRIP signal is, however, dependent on whether the event is due to a conventional fault or to a connection or disconnection of a line zone.

A test as to whether an abrupt event has occurred is performed as a transient analysis by comparing the $V_L$-loss functions (23a) and (23b) with a threshold value, for example by investigating, as earlier for $x\epsilon(R, S, T)$, whether $$V_{Lx}^{Ck}(t) > \eta_{LC} \tag{24a}$$

and $$V_{Lx}^{Ek}(t) > \eta_{LE} \tag{24b}$$

The reason why this must be accomplished as a transient analysis is that, based on the residuals, both the $V_L$- and the $V_G$-functions will, after a fault, assume a great value for only a short period of time. When, after a restart of the parameter estimator, the new model parameters have become stabilized, the functions resume the same low value as before the fault.

If the tests according to (24a) and (24b) show that threshold values have been exceeded, a steady-state analysis is carried out to determine whether it is a question of a conventional fault or whether it is a question of a connection or disconnection of a line or a phase. As mentioned above, this is necessary in order to determine when a TRIP signal is to be delivered.

If an event according to the above has occurred, it can be determined in the following manner if there is a fault on the line or if the detection of an event is due to a disconnection of a line or a phase. If a function $f(a_1, a_2)$ of the Fourier components $a_1$ and $a_2$ of the fundamental component according to (20) of any of the phase voltages is lower than a set limit value, for example $\eta_0$, this indicates that the phase in the corresponding line has been disconnected. This can be determined, for example, by studying the inequality $$\sqrt{a_1^2 + a_2^2} < \eta_0 \tag{25a}$$

To prevent the protective relay at one terminal from giving a faulty indication when a line is switched in, in similar manner a steady-state analysis is also required, which is also suitably based on the Fourier components, expressed, for example, through the inequality $$\sqrt{a_1^2 + a_2^2} > \eta_I \tag{25b}$$

It is necessary, however, that a certain time passes from the indication of an abrupt event until the testing according to the above criterion is carried out.

The operations which are executed in accordance with equations (25a) and (25b) are often referred to, by the experts in this particular field, as filter functions. The filter may, of course, consist of a separate unit within the local logic unit.

The information about the results of the local steady-state analyses must be forwarded to the central logic unit. The Fourier components can also be transmitted at limited speed to the central logic unit where the evaluation can be performed. This may, for example, be a study of slow changes of the amplitude of the current, and the like.

As mentioned above, a local study of the signs of the instantaneous residuals is utilized to determine the direction to a possible fault. There are several different methods for obtaining the polarity of the instantaneous current residuals. To obtain representative readings, the polarity should be studied for a certain period of time. In principle, this can be done by summation of a number (s) of consecutively calculated residuals and by judging the sign of the sum, for example expressed as $$\sum_{1}^{s} \epsilon_x \gtrless 0 \qquad (26)$$

As mentioned under the description of the prior art, conventional signal measurement and transformation, synchronization of sampling, parameter and frequency estimators and code compression are included for the local parts of a longitudinal differential protective system according to the invention.

A longitudinal differential protective system according to the invention can be largely characterized as a typical master/slave system in which the local longitudinal differential protective relay, which comprises the central logic unit, functions as master and the other longitudinal differential protective relays operate as slaves.

BRIEF DESCRIPTION OF THE DRAWING

The invention will be described below with reference to the accompanying drawing, the single FIGURE of which shows the construction of a longitudinal differential protective system according to the invention.

DESCRIPTION OF THE PREFERRED EMBODIMENTS

A longitudinal differential protective system according to the invention comprises an optional number of local longitudinal differential protective relays $T_1, \ldots, T_k, \ldots, T_n$, according to the FIGURE, in a corresponding number of terminals. These are located so that each line zone in the optionally connected power network that is to be protected has one local longitudinal differential protective relay at all ends of each line zone. One of the terminals is supplemented with a central logic unit, the protective relay in this terminal operating as master for the other slave protective relays.

Signals arriving at each terminal or local protective relay consist of the current phase currents, $I_x$, and phase voltages, $E_x$, at the terminal, with $x \in (R, S, T)$. The measurement is performed, in principle, in a measuring device 1 for measuring of both current and voltage. After high frequency filtering in filter 2, conversions from analog to digital representation of the signals take place in the A/D converter 3.

As already mentioned, each local longitudinal differential protective relay comprises a Fourier parameter estimator 4 and a frequency estimator 5 according to known technique. In addition, a sampling regulator 6 is included, the task of which is to ensure that the sampling time is adapted to changes in the frequency of the processed signal. Since the gain vector $L(t)$ of the parameter estimator 4 according to equation (15) is computed during the initialization, it is necessary to adapt the time between the samplings so that the number of sample points per period is constant. This means that the sampling regulator 6 must be supplied with the current frequency value $\hat{\omega}_0$, the estimated Fourier signal $\hat{y}$ and the parameter estimation vector $\hat{\theta}$. Otherwise, the sampling is synchronized, as described, via local clocks (not shown) at the terminals which are calibrated via satellite pulses. These are symbolized in the FIGURE by the block 7, "SYNCHRONIZATION", which may be placed in any of the local protective relays or in the master protective relay.

Furthermore, each local longitudinal differential protective relay comprises a local logic unit 8 which is supplied, from the parameter estimator 4, with the instantaneous current and voltage residuals $\epsilon_x(t)$ of all the phases as well as the parameter estimation vector $\hat{\theta}$. In the local logic unit 8, the loss functions $V_{Lx}^{Ck}$ for the phase currents and the loss functions $V_{Lx}^{Ek}$ for the phase voltages are first computed according to equation (23). Thereafter, the computed values are tested against the respective threshold values $\eta_{LC}$ and $\eta_{LV}$. If this transient analysis shows that the threshold values have been exceeded, this means that an event has occurred in the network which has to be investigated. As mentioned, this is performed on the basis of an investigation of the steady state of the network, which can be carried out by analysis of the filter functions. Thus, the Fourier components $a_1$ and $a_2$ of the fundamental component of the voltages are studied and it is then possible, by comparison with the threshold value $\eta_0$, to see whether the event has been caused by a disconnection of a line or a phase, and to see whether the Fourier components, after having been zero, show a certain value indicating connection of a line or a phase. If the observed event is due to a connection or disconnection of a line or a phase, no further measures have to be taken. However, as mentioned above, the parameter estimator 4 is always restarted upon each abrupt change in the system.

If the filtering shows that the event must have been caused by a conventional line fault, it is the duty of the local logic unit to find out whether the current at the respective terminal is directed towards or away from the terminal ($I_x \rightleftarrows$?) and also to find out the polarity of the instantaneous current residuals, for example by means of equation (26), in order to determine the direction to the fault.

The information obtained during the local logic processing in all the terminals is now to be forwarded to the central logic unit 10 for further processing and evaluation. As will be clear from the above, modern communication possibilities require that the amount of data that is to be transmitted should be compressed. A plurality of different strategies for such compression are available, for example by transmitting parameter data distributed among a number of samplings. For this reason no detailed description will be given other than that the signal compression is performed in unit 9, i.e. the SIGNAL COMPRESSION UNIT. The necessary information to unit 9 comprises $\epsilon_x^C(t)$, i.e. the current residuals $\epsilon_x^E(t)$, i.e. the voltage residuals $d_p$ which is a 1-bit variable indicating whether the occurred event derives from a conventional fault or a disconnection of a phase (or phases) in the line $d_W$ which is a 1-bit digital variable indicating the direction to the fault from a terminal $\hat{\theta}_L$, i.e. the Fourier components which are needed in the central logic unit for steady state analysis of slow changes.

The data transmission from the other terminals to the central logic unit 10, which in the example shown is located in terminal k, comprises the same signals and is symbolically shown to be accomplished via the units 11, DATA TRANSMISSION T₁, and 12, DATA TRANSMISSION T$_n$.

As will be clear from the above disclosure of the invention, the sum $\sigma_x(t)$ of the current residuals, according to equation (19), from all the terminals is now first computed, phase-by-phase, in the central logic unit 10. Thereafter, the loss functions V$_{Gx}$, according to equation (12), are determined phase-by-phase.

If the power transmission line is faultless, these loss functions are to exhibit very small values. When a fault has occurred on any line zone, V$_{Gx}$ will assume a great value for a short time only, as previously mentioned. By comparison with a threshold value $\eta_G$, it can now be determined whether any line zone has faulted and if a TRIP signal can be delivered. Together with the other information transmitted from the terminals, it can now be stated which line zone and which phase has faulted. With the available information, it is also a simple matter to suply a state diagram indicating the current state of the power network. The states can then symbolize a faultless situation, a conventional fault, and an abrupt change. With the aid of the logic processing described, it is also possible to determine when the transitions between the various states have taken place.

We claim:

1. Longitudinal differential protective relays for protection of line zones included in power distribution systems, which protective relays, arranged at terminals at all the ends of each line zone, are provided with a measuring device for measuring the current and voltage of the phase quantities, a filter for high-frequency filtering of the measured signals and an A/D converter for conversion from analog to digital representation of the measured and filtered signals, said digital signals being adapted to be supplied to a Fourier parameter estimator which is adapted to cooperate with a frequency estimator and a sampling regulator, said Fourier parameter estimator being adapted to generate the Fourier components for a truncated model ($\hat{M} = a_1 \sin \omega_0 t + a_2 \cos \omega_0 t$) of the measured phase quantities and the respective residuals, wherein said Fourier parameters and residuals, generated by the parameter estimator, are adapted to be supplied to a local logic unit which is adapted to determine whether an abrupt event has occurred in the power distribution system by comparison of the loss functions $V_{Lx}^{Ck}(t)$ and $V_{Lx}^{Ek}(t)$ with the respective threshold values $\eta_{LC}$ and $\eta_{LE}$ according to $$V_{Lx}^{Ck}(t) = \sum_{j=1}^{t} \lambda^{t-j}(\epsilon_{xk}^C(j))^2 = \lambda V_{Lx}^{Ck}(t-1) + (\epsilon_{xk}^C(t))^2 > \eta_{LC} \quad (23,24)$$

$$V_{Lx}^{Ek}(t) = \sum_{j=1}^{t} \lambda^{t-j}(\epsilon_{xk}^E(j))^2 = \lambda V_{Lx}^{Ek}(t-1) + (\epsilon_{xk}^E(t))^2 > \eta_{LE} \quad (23,24)$$

where L indicates local logic processing, $x\epsilon$(R, S, T) indicates that both V-functions and corresponding residual functions $\epsilon$ are based on current values, E indicates that the same functions are based on voltage values, k indicates that the equations are valid for each terminal, $\lambda$ is a forgetting factor within the region 0,5–1.0, and, if the threshold values have been exceeded, the local logic unit is adapted to initiate a restart of the parameter estimator and determine whether the abrupt event derives from a conventional fault in the power distribution system by comparing a function $f=\sqrt{a_1^2+a_2^2}$ with two threshold values $\eta_0$ and $\eta_I$ according to $\eta_0 > \sqrt{a_1^2+a_2^2} > \eta_I$, and, if the function is within the threshold region, the local unit is further adapted to determine the current direction and the signs of the current residuals, whereby the fourier components, the residuals and the information that the abrupt event derives from a conventional fault and information about the current direction are code-compressed in a signal compression unit to be transmitted to a central logic unit located at one of the terminals and adapted to compare loss functions with a threshold value according to $$V_{Gx}(t) = \sum_{j=1}^{t} \lambda^{t-j}\sigma_x^2(j) = \lambda V_{Gx}(t-1) + \sigma_x^2(t) > \eta_G \quad (19,21,22)$$

where G indicates that the loss function belongs to the central logic unit and where $\sigma_x(t)$ is the sum of the current residuals of all the terminals and that, if the threshold value is exceeded, the longitudinal differential protective system is adapted to deliver a TRIP signal and to indicate a faulty line zone and a faulty phase.

2. Longitudinal differential protective relay according to claim 1, wherein, if the local logic unit determines that the function $f=\sqrt{a_1^2+a_2^2}$ lies outside the threshold value $\eta_0 > \sqrt{a_1^2+a_2^2} > \eta_I$, the TRIP signal shall be blocked.

3. Longitudinal differential protective relay according to claim 1, wherein the sampling control in all local protective relays is controlled by satellite pulses via a synchronization unit.

* * * * *